United States Patent
Spencer

(10) Patent No.: US 8,073,471 B1
(45) Date of Patent: Dec. 6, 2011

(54) SAVING POWER IN WIRELESS COMMUNICATION DEVICES

(75) Inventor: Paul S. Spencer, Modiin (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 934 days.

(21) Appl. No.: 11/966,831

(22) Filed: Dec. 28, 2007

Related U.S. Application Data

(60) Provisional application No. 60/883,212, filed on Jan. 3, 2007.

(51) Int. Cl.
*H04W 68/00* (2009.01)

(52) U.S. Cl. ..... 455/458; 455/455; 455/574; 455/426.1; 455/515; 455/343.4; 370/311

(58) Field of Classification Search ............... 455/426.1, 455/458, 515, 516, 574, 343.2; 370/311
See application file for complete search history.

(56) References Cited

U.S. PATENT DOCUMENTS

| | | | |
|---|---|---|---|
| 6,990,059 B1 * | 1/2006 | Anikhindi et al. | 370/208 |
| 2003/0058820 A1 | 3/2003 | Spencer et al. | |
| 2005/0030914 A1 * | 2/2005 | Binzel et al. | 370/312 |
| 2007/0184866 A1 * | 8/2007 | Kim et al. | 455/515 |

OTHER PUBLICATIONS

G. David Forney, Jr, "Maximum-Likelihood Sequence Estimation of Digital Sequences in the Presence of Intersymbol Interference", May 1972, IEEE Transactions on Information Theory, vol. IT-18, No. 3.*

* cited by examiner

*Primary Examiner* — Vladimir Magloire

(57) ABSTRACT

Apparatus and methods for reducing the amount of time a mobile wireless device needs to be in a wake mode in order to determine whether a particular paging message is or is not directed to the mobile wireless device. The method includes: receiving, by a mobile device of a wireless network, a first paging message; processing, by the mobile device, a portion of the first paging message including comparing the processed portion of the first paging message with a processed portion of a second paging message previously received by the mobile device; and determining, by the mobile device, whether to process other portions of the first paging message based at least in part on the comparison.

19 Claims, 4 Drawing Sheets

SAVING POWER IN WIRELESS COMMUNICATION DEVICES

CROSS-REFERENCES TO RELATED APPLICATIONS

The present application claims priority to U.S. Patent Application No. 60/883,212, filed Jan. 3, 2007, entitled "Power Saving for GSM Handset," the entire disclosure of which is hereby incorporated by reference in its entirety for all purposes.

TECHNICAL FIELD

Embodiments of the present invention relate to the field of wireless communication and, in particular, to power saving in wireless communication devices.

BACKGROUND

Messages transmitted to wireless communication devices such as cellular phones are typically encoded, for example, to reduce the chance that noise will corrupt the message. The encoding of the message typically includes adding redundancy (i.e., making the encoded message longer than the original message), introducing symbol dependency (i.e., making the values of each symbol in the encoded message a function of a plurality of bits in the original message), and/or interleaving the message (i.e., mixing the order of the symbols in the encoded message). In the following description and for ease of illustration, a network device that is transmitting a message may be referred to as a transmitter device, while a network device that receives the message may be referred to as a receiver device.

The decoding of the received message at the receiver device is usually performed by finding an original message that would result in the received encoded message with the highest probability. Due to the interleaving and the interdependence of the symbols of the encoded message, the decoding process does not usually begin before the entire message of a predetermined length is received. If the message was not interleaved, some decoding schemes would allow the decoding to begin before the entire message was received and end when the entire message is received. However, such schemes usually have a reduced performance, i.e., a higher rate of failure in correctly decoding the message, in particular in fading channels that are often encountered in practice.

The received message will usually include an error detection code, which is used to determine whether the message was properly decoded. One such code is the cyclic redundancy code (CRC).

Mobile wireless devices, such as cellular phones, typically operate on rechargeable batteries. In order to conserve power, some cellular systems reduce the rate at which the cellular phones consume battery power by having the phones operate in different power consumption modes. For example, such mobile wireless devices may operate in a very low power consuming "idle" mode when such devices are not receiving or transmitting messages or calls. Generally, in the idle mode, the cellular phones deactivate most of their components to reduce their power consumption. Periodically, for example, once every two seconds, the cellular phones will switch from being in an idle mode in which most of their components are deactivated to go into a "partial" wake mode where at least some of their components are activated in order to process paging messages received from a base station of a wireless network. While in the partial wake mode, the base station may send a broadcast or paging message to the cellular phones on a paging channel notifying them to either revert back to the idle mode or to change to a reception or "fully" wake mode, for example in order to receive an incoming call or message. When in a fully wake mode, these mobile wireless devices may be fully powered and most or all of their system components may be fully functional in order to process the incoming call.

The wake-up period for the partial wake mode comprises a warm-up period, a reception period, a decoding period and a shut down period. In the wake-up period the cellular phone activates some or many of its components in order to receive the paging message. Thus, the cellular phone will consume a relatively large amount of power during the wake-up period. If the paging message tells the cellular phone to revert back to the idle mode, the cellular phone shuts down most of its components during the shut down period. Any reduction in the length of the wake-up period results in reducing power consumption and an increase in the time a cellular phone may be used without recharging or replacing its battery.

Because of the large amount of power consumed during the wake-up periods, the amount of time that a cellular phone may remain operational without recharging its batteries may be significantly reduced.

SUMMARY

According to various embodiments of the present invention, an apparatus and a method are described that allow a mobile wireless device to reduce power consumption by minimizing the amount of time it needs to be in a wake mode in order to process paging messages. The apparatus may include, among other things, a database to store at least processed portions of one or more paging messages, and control circuitry to process a portion of a first paging message received by the apparatus from a wireless network including comparing the processed portion of the first paging message with a processed portion of a second paging message previously received by the apparatus. The control circuitry may further be designed to determine whether to process other portions of the first paging message based at least in part on the comparison.

In some embodiments, the apparatus may be adapted to receive a first paging message including four bursts, the four bursts corresponding to four sequential time slots including a first, a second, a third, and a fourth time slot. For these embodiments, the control circuitry may be adapted to process a portion of a first paging message that includes at least a portion of a burst corresponding to the first time slot, and to determine whether to process other portions of the first paging message that includes at least bursts corresponding to the second, third, and fourth time slots.

In some embodiments, the control circuitry may be adapted to process at least a portion of the burst corresponding to the first time slot including an entire burst corresponding to the first time slot. Further, the control circuitry may be adapted to cause the apparatus to go into an idle mode by deactivating a plurality of components of the apparatus based at least in part on the comparison of the processed portion of the first paging message to the processed portion of the second paging message. For these embodiments, the control circuitry may be further adapted to cause the apparatus to go into an idle mode when the control circuitry determines that the processed portion of the first paging message substantially matches with the processed portion of the second paging message. The apparatus may be further adapted to receive portions of a first and a second paging message that may each include a plurality of bits, and the control circuitry may be further adapted to determine or conclude that the processed portions of the first and second paging messages substantially matches if less than four bits of the portion of the first paging message does not match with four corresponding bits of the portion of the second paging message.

In some embodiments, the control circuitry may be adapted to compare the processed portion of the first paging message with a processed portion of a third paging message previously received by the apparatus, and to determine whether to process other portions of the first paging message based, at least in part, on the comparison of the processed portion of the first paging message with the processed portion of the third paging message. For these embodiments, the control circuitry may be further adapted to cause the apparatus to not process the other portions of the first paging message if the control circuitry determines that the processed portion of the first paging message substantially matches the processed portions of the second or third paging messages.

In some embodiments, the apparatus may be adapted to receive portions of the second and third paging messages prior to receiving the portion of the first paging message to be processed and analyzed. For these embodiments, the control circuitry may be adapted to process the portions of the second and third paging messages received by the apparatus, and to store at least the processed portions of the second and third paging messages into the database.

In some embodiments, the apparatus may be adapted to receive a portion of a first paging message comprising a plurality of bits. The control circuitry may be further adapted to determine log likelihood ratios (LLRs) of the bits of the portion of the first paging message, and may compare the LLRs of the first paging message with the bits of the second paging message. By comparing the LLRs of the bits of the portion of the first paging message to the bits of the second paging message to see if they substantially match, a determination may be made as to whether the first paging message is the same as the second paging message. For these embodiments, the apparatus may be adapted to receive a second paging message that is directed to another apparatus of the wireless network, or a second paging message that is an empty message. In these cases, the control circuitry may be adapted to determine whether the LLRs of the bits of the portion of the first paging message substantially matches the bits of the portion of the second paging message, and if they substantially match, the control circuitry may cause the apparatus to go into an idle mode to not process the other portions of the first paging message.

In some embodiments, the apparatus may be adapted to receive a second paging message that is directed to another apparatus of the wireless network, or that is an empty message. For these embodiments, the control circuitry may be adapted to cause the apparatus to go into an idle mode to not process the other portions of the first paging message if the control circuitry determines that the processed portion of the first paging message substantially matches the processed portion of the second paging message.

In some embodiments, the apparatus may be adapted to receive a first paging message from a base station of the wireless network, the first paging message being an interleaved paging message. For these embodiments, the control circuitry may be adapted to determine whether a communication channel between the base station and the apparatus has a signal to interference plus noise ratio (SINR) of equal to or greater than 10 dB to determine whether to proceed with the comparison of the processed portion of the first paging message with the processed portion of the second paging message and the subsequent determination as to whether to process other portions of the first paging message.

According to various embodiments of the present invention, an article of manufacture is provided comprising a storage medium, and a set of instructions stored in the storage medium, which, when executed by an apparatus, causes the apparatus to perform operations comprising receive a first paging message through a wireless network, process a portion of the first paging message including comparing the processed portion of the first paging message with a processed portion of a second paging message previously received by the apparatus, and determine whether to process other portions of the first paging message based at least in part on the comparison.

For these embodiments, the receiving operation may include receiving a first paging message including four bursts, the four bursts corresponding to four sequential time slots including a first, a second, a third, and a fourth time slot, and the portion of the first paging message includes at least a portion of a burst corresponding to the first time slot, while the other portions of the first paging message includes at least bursts corresponding to the second, third, and fourth time slots.

In some embodiments, the set of instructions may further cause the apparatus to go into an idle mode by deactivating a plurality of components of the apparatus based at least in part on the comparing of the processed portion of the first paging message to the processed portion of the second paging message. For these embodiments, the set of instructions may also cause the apparatus to go into an idle mode when the processed portion of the first paging message substantially matches with the processed portion of the second paging message. In some embodiments, each of the portions of the first and second paging messages may include a plurality of bits, and the set of instructions further causes the apparatus to determine that the processed portions of the first and second paging messages substantially matches if less than four bits of the portion of the first paging message does not match with four corresponding bits of the portion of the second paging message.

In some embodiments, the processing of a portion of the first paging message comprises comparing the processed portion of the first paging message with a processed portion of a third paging message previously received by the apparatus, and the set of instructions may further cause the apparatus to determine whether to process other portions of the first paging message based at least in part on the comparison of the processed portion of the first paging message with the processed portion of the third paging message. For these embodiments, the set of instructions may further cause the apparatus to process the other portions of the first paging message if the processed portion of the first paging message substantially matches the processed portions of the second or third paging messages. Alternatively or in the same embodiments, the set of instructions may further cause the apparatus to receive the portions of the second and third paging messages prior to receiving said portion of the first paging message, to process the portions of the second and third paging messages, and to store the processed portions of the second and third paging messages.

In some embodiments, the portion of the first paging message may comprise a plurality of bits, and said set of instructions further causes the apparatus to determine log likelihood ratios (LLRs) of the bits of the portion of the first paging message, and the comparing is by comparing the LLRs of the first paging message with bits of the second paging message. For these embodiments, the second paging message may be directed to another apparatus, or is an empty message, and the set of instructions may further cause the apparatus to said comparing by determining whether the LLRs of the bits of the portion of the first paging message substantially matches the bits of the portion of the second paging message, and if they substantially match, cause the apparatus to go into an idle mode to not process the other portions of the first paging message.

According to various embodiments of the present invention, an apparatus is provided, comprising a means for receiving a first paging message through a wireless network, a means for processing a portion of the first paging message including means for comparing the processed portion of the first paging message with a processed portion of a second paging message previously received by the apparatus, and a means for determining whether to process other portions of the first paging message based at least in part on the comparison. In some embodiments, the apparatus may further comprise a means for storing and providing the processed portion of the second paging message.

In some embodiments, the apparatus may further comprise means for receiving a first paging message including four bursts, the four bursts corresponding to four sequential time slots including a first, a second, a third, and a fourth time slot, a means for processing a portion of a first paging message that includes at least a portion of a burst corresponding to the first time slot, and a means for determining whether to process other portions of the first paging message that includes at least bursts corresponding to the second, third, and fourth time slots.

In some embodiments, the apparatus may further comprise a means for causing the apparatus to go into an idle mode by deactivating a plurality of components of the apparatus based at least in part on the comparing of the processed portion of the first paging message to the processed portion of the second paging message. For these embodiments, the apparatus may also include a means for causing the apparatus to go into an idle mode when determining that the processed portion of the first paging message substantially matches with the processed portion of the second paging message. In some embodiments, the apparatus may further include a means for receiving portions of a first and a second paging message that each include a plurality of bits, and means for determining that the processed portions of the first and second paging messages substantially matches if less than four bits of the portion of the first paging message does not match with four corresponding bits of the portion of the second paging message.

These and other features of various embodiments of the present invention are described in greater detail herein.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "some embodiments" or "various embodiments" means that a particular feature, structure, or characteristic described in connection with the embodiment is included in at least one embodiment. The appearances of the phrase "in various embodiments" in various places in the specification do not necessarily all refer to the same embodiments, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

According to various embodiments of the present invention, apparatuses and methods are provided that allow a mobile wireless device to reduce the amount of time it needs to be in a wake mode in order to determine whether a particular interleaved message is or is not directed to the mobile wireless device. In particular, the novel methods may be implemented at a mobile wireless device and may include analyzing only portions of incoming paging messages to determine whether the incoming paging messages are or are not directed to the mobile wireless device. The analysis may include comparing the processed portions of the incoming paging messages to one or more processed portions of a previously received paging message or to one or more portions of messages that have already been determined to be not directed to the mobile wireless device. In doing so, power consumption of the wireless communication device may be reduced, extending the operational time of the device without additional recharging of the battery. A mobile wireless communication device, as described herein, may be a variety of communication devices such as a cellular phone, a personal digital assistant (PDA), a laptop computer, or any other type of device capable of communicating in a wireless network.

Figure 1:
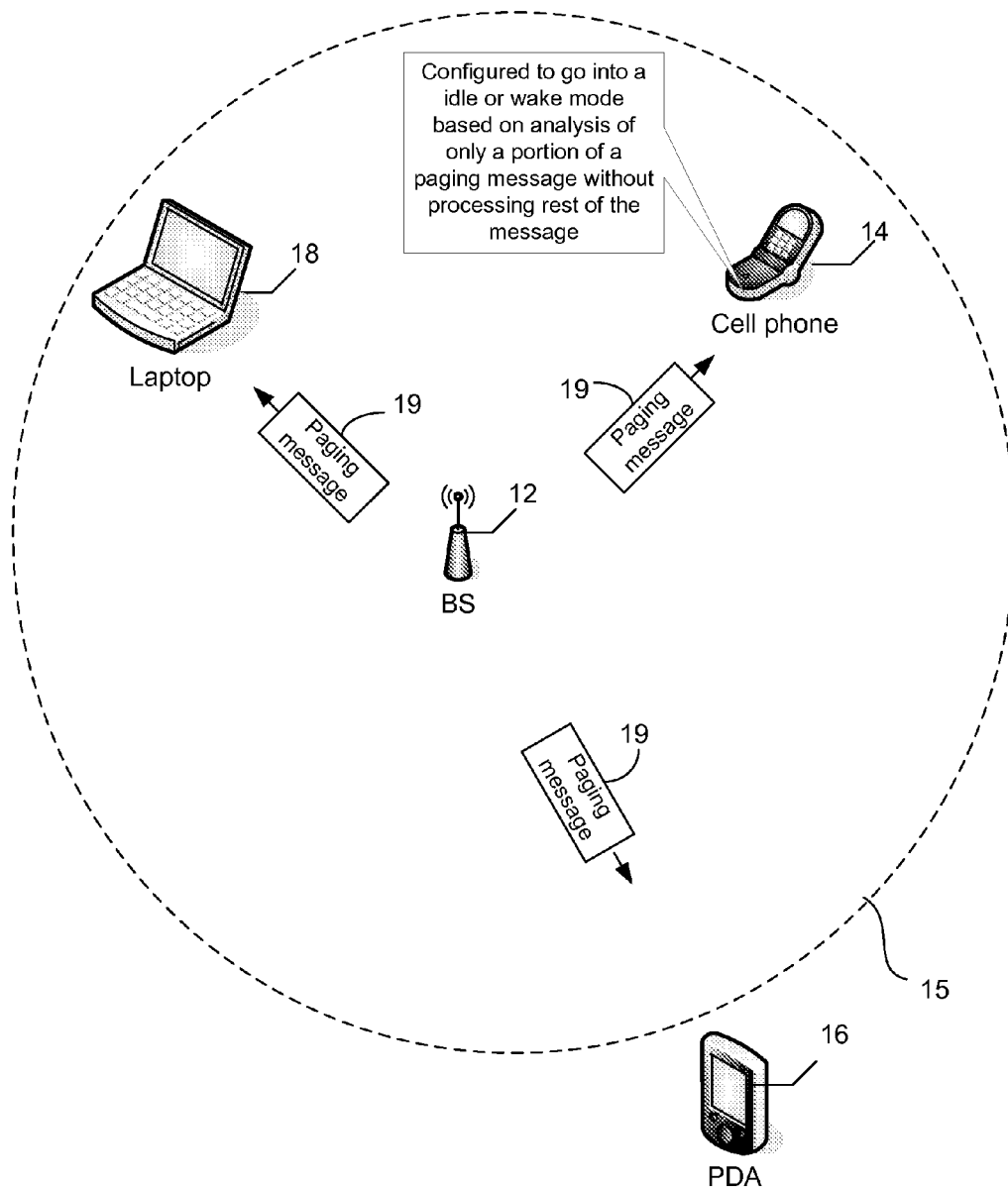
FIG. 1 illustrates a wireless network in accordance with various embodiments of the present invention.

FIG. 1 illustrates a wireless network in accordance with various embodiments of the present invention. The wireless network 10, in some instances, may be a cellular cell and may include, among other things, a base station (BS) 12 in communication with a plurality of mobile wireless communication devices (mobile devices) 14, 16, and 18, which in this case, are a cellular phone, a PDA, and a laptop. Note that although only three mobile devices 14, 16, and 18 are depicted, in alternative embodiments, more or fewer mobile devices may be included in the wireless network 10. In some instances, the BS 12 may be an access point or a cellular tower, for example.

The BS 12 may periodically transmit paging messages 19 to the mobile devices 14, 16, and 18 via a paging channel. Correspondingly, the mobile devices 14, 16, and 18 may partially wake themselves up at predetermined intervals to correspond with when the paging messages arrive at the mobile devices 14, 16, and 18. It has been determined that during the course of time most of the paging messages 19 transmitted by the BS 12 will not be directed to any particular mobile device, such as mobile device 14. Rather, many of the paging messages 19 broadcasted by the BS 12 may be repeat messages that are being repeatedly transmitted and directed to the other mobile devices 16 and 18 of the wireless network 19, or may merely be empty messages when no mobile device is being paged. Thus, in order to take advantage of this fact, embodiments of the present invention contemplate that a mobile device 14 may save one or more previously received paging messages or at least certain processed portions of such previously received paging messages that the mobile device 14 may "know" or identify as being not directed or meant for the mobile device 14.

As will be further described, this stored information may then be subsequently used to analyze only portions of future incoming paging messages to determine whether the incoming paging messages are directed to the mobile device 14, directed to the other mobile devices 16 and/or 18, or are simply empty messages, without having to process the entire paging message. By doing so, the mobile device 14 may reduce the amount of time it needs to be in the partial wake mode in order to process incoming paging messages, thus resulting in power savings. The portion of a paging message to be processed and analyzed, in some embodiments, may include only the portion of the paging message that corresponds to a first time slot (a paging message may be transmitted over four time slots), or a portion thereof. For purposes of this description, the phrase "wake mode" as used herein will be in reference to a "partial" wake mode rather than to the previously described "fully" wake mode unless indicated otherwise.

According to some embodiments of the present invention, prior to processing and analyzing only a portion of an incoming paging message, a determination may be made to assure that the signal to interference plus noise ratio (SINR) of the communication channel (i.e., paging channel) is equal to or greater than, for example, 10 dB (decibel) or some other predetermined value. That is, since only a portion of the paging message is to be analyzed, it may be advantageous to make sure that the communication channel is of a relatively high quality.

Typically the SINR of a communication channel may depend on the location of the receiver device (e.g., mobile device 14) with respect to the transmitter device (e.g., BS 12). That is, the SINR will generally decrease as the receiver device moves further away from the transmitter device. In FIG. 1, the dotted circle represents the range 15 in which the SINR is equal to or greater than 10 dB. Outside of this range 15, the SINR of the paging channel may be less than 10 dB. In this case, mobile device 16 is outside the range 15, and may not be able to implement the novel processes described herein. Thus, in some embodiments, the mobile device 14 may initially determine the SINR of the communication channel (i.e., paging channel) between the BS 12 and the mobile device 14. If the mobile device 14 determines that the SINR is equal to greater than 10 dB, then the mobile device 14 may proceed to execute the novel processes to be described herein. On the other hand, if the mobile device 14 determines that the SINR is less than 10 dB, then the mobile device 14 may employ other techniques for determining whether incoming paging messages are directed to or not directed to the mobile device 14. However, these alternative techniques may need to process a larger portion of a paging message in order to properly analyze (i.e., determine whether the paging message is or is not directed to the mobile wireless device) the paging message. For example, although the novel processes may need to only process and analyze one time slot, or a portion thereof, alternative techniques may require two or more time slots.

Figure 2:
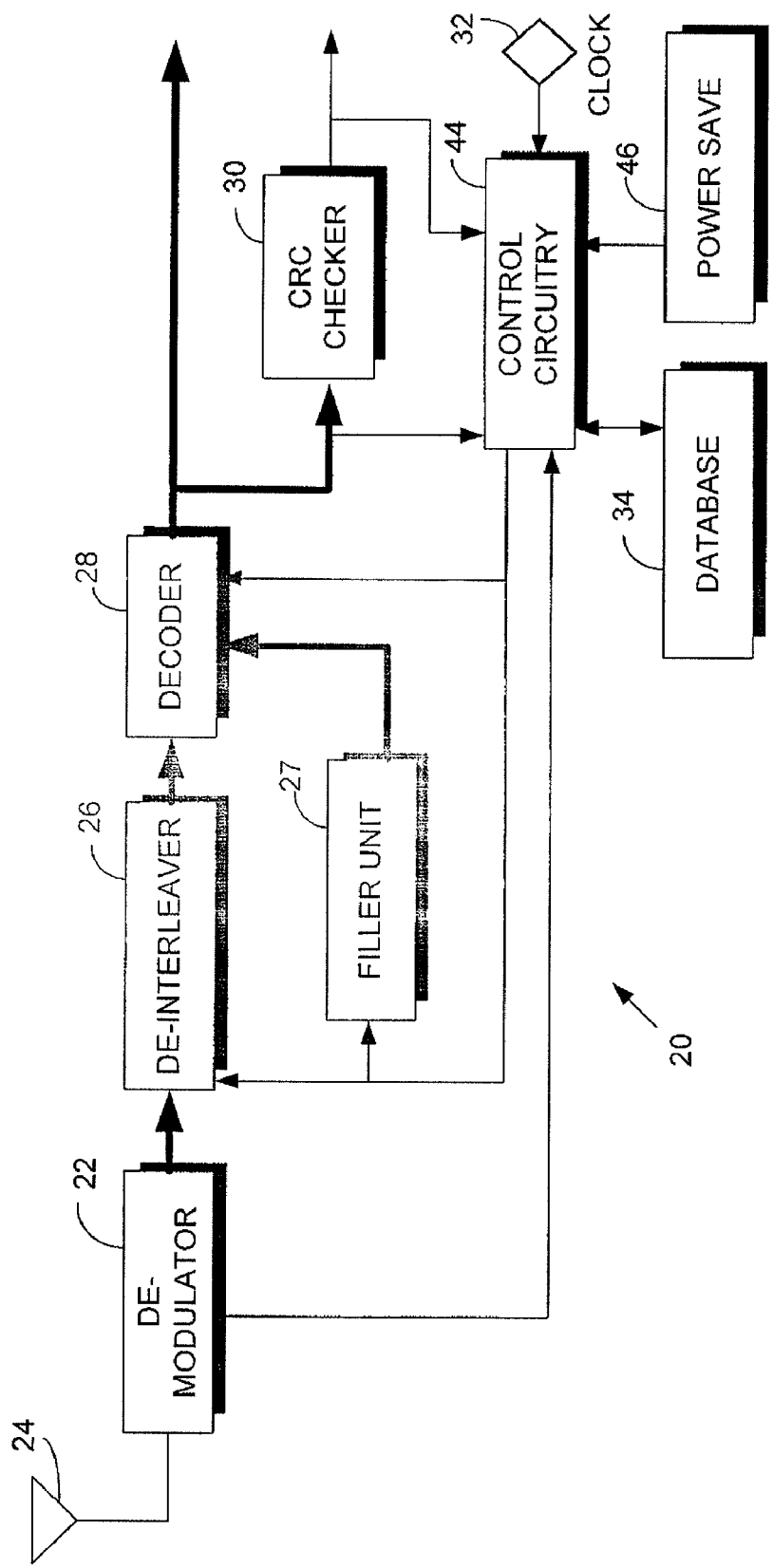
FIG. 2 illustrates a wireless mobile device in accordance with various embodiments of the present invention.

Referring to FIG. 2, a mobile wireless communication device (or simply "device") in accordance with various embodiments of the present invention is depicted. The device 20, which may be a mobile device of a wireless network, includes, among other things, a demodulator 22 that receives time slots of transmitted paging messages via an antenna 24, and a de-interleaver 26 that stores an incoming time slot. A decoder 28 decodes the incoming time slots from the de-interleaver 26. After accumulating an entire paging message, which may include a plurality of time slots, a single time slot, or less than a single time slot, a CRC checker 30 checks the decoded message from the decoder 28 to determine whether the decoding was successful.

The device 20 also includes control circuitry 44, implemented for example by a digital signal processor (DSP), with appropriate software, that instructs the decoder 28 when to begin decoding received time slots. For example, the control circuitry 44 may execute software, such as instructions stored in a computer readable medium (as depicted by power save block 46 in FIG. 2), in order to perform the various novel operations described herein. As will be further described, the device 20 may further include a database 34 for storing at least the processed portion or portions of previously received paging message or messages as will be further described.

In order to save time, at least some of the time slots received by device 20 may be decoded before the de-modulator 22 receives the entire message, and the decoding may be performed without received values for at least some of the symbols of the frame. Further, the decoding may finish before the entire message is received in some embodiments.

The control circuitry 44 may indicate which data to pass to the decoder 28 from the de-interleaver 26 for decoding. The control circuitry 44 may also determine when to perform decoding based on an input from a clock 32.

The components of device 20 shown in FIG. 2 may be implemented by a plurality of sub-components or may be part of a single physical component, which includes other components. For example, in some embodiments of the invention, the filler unit 27 may be an integral part of decoder 28 and/or of de-interleaver 26.

While in the idle mode, the device 20 may wake up to go into a wake mode periodically, at predetermined times, in order to receive a control message (i.e., paging message) from a base station. In some embodiments, the device 20 may be sufficiently awakened to analyze the control message but not sufficiently awaken to handle an incoming message. The control message informs the device 20 whether the device 20 is to receive an incoming message or return to sleep. The handling of the paging messages may be responsible for most of the power consumption of device 20 during the wake mode (i.e., partial wake mode). Thus, it may be advantageous in some embodiments to reduce the average length of the period when the device 20 experiences increased wake mode power consumption.

When a message from the base station to device 20 is due, clock 32, or a different clock controlling the device 20, wakes up the device 20. The de-modulator 22 begins to receive a frame and stores it in the de-interleaver 26.

In some embodiments of the present invention, the decoder 28 decodes convolutional codes with a Viterbi style decoder, as described, for example, in chapter 6.2 of "Error-Correction Coding for Digital Communications," by G. C. Clark and J. Bibb Cain, Plenum Press, March 1988 and in Formey, G. D., Jr. (1972), "Maximum-Likelihood Sequence Estimation of Digital Sequences in the Presence of Intersymbol Interference," IEEE Trans. Inform. Theory, Vol. IT-18, pp. 363-378.

On the transmitter device side (e.g., base station) of the wireless network, a paging message (i.e., paging block) may include four radio bursts (or simply "bursts") to be transmitted over four sequential time slots. In one embodiment of the present invention, a Global System for Mobile Communications (GSM) protocol may be utilized. See GSM Specification TS 101 220 (2000 May 26) Version 8.00 "Digital Cellular Telecommunications System (Phase 2+)" available from the European Telecommunications Standards Institute, 06921 Sophia Antipolis, France. In such embodiments, the paging information may comprise 184 bits, a check sum may comprise 40 bits, and four zeros may comprise 4 bits, making a message of 228 bits used for convolutional coding. The 228 bits may be passed through a one-half rate convolutional code so that for each bit of information, two symbols come out of the encoder. Thus, 456 symbols are interleaved and transmitted over four time slots in one embodiment. Each time slot may thus include 114 symbol positions in that embodiment.

In various embodiments, the de-modulator 22 of the receiver device (i.e., device 20) may extract the transmitted bits, which may then provide the extracted bits to the de-interleaver 26. The de-interleaver 26 receives 456 symbols for a particular paging block. When a message is first being prepared for transmission by the transmitter device (e.g., BS 12), the transmitter device may or may not interleave all, some, or none of the message. In interleaving, symbols may be placed in a plurality of different time slots, such as four time slots. As one example, the first of 456 symbols may be placed in a first time slot, the second symbol in the second time slot, the third symbol in the third time slot, the fourth symbol in the fourth time slot, the fifth symbol in the first time slot, the sixth symbol in the second time slot, the seventh symbol in the third time slot and the eighth symbol in the fourth time slot, and so on. Thus, successive sets of four symbols are placed successively in the four time slots.

Adjacent symbols may be spread across different time slots as a result of the interleaving process. By spreading the symbols across the time slots, it is more likely that those symbols may be recovered. As a result, on the receiver device side (e.g., device 20), the de-interleaver 26 may recover the symbols from the different time slots in the correct order. The decoder 28 may then calculate the check sum and the checker 30 checks the check sum calculated by the decoder 28 to determine whether or not it is correct.

The filler unit 27 may not be used in some embodiments. The filter unit 27 may be employed to provide missing symbols. That is, whenever symbols are missing because they have not yet been demodulated, a zero may be inserted by the filler unit 27 where the symbol would otherwise have been.

At predetermined intervals, the control circuitry 44 may cause the device 20 to wake itself up to go from an idle mode to a wake mode. Note again that when the device 20 transitions into the wake mode, it may only be partially "awakened" such that the device 20 can sufficiently process at least a portion of the paging message but not fully awakened to process an incoming message or call. In some embodiments, the control circuitry 44 may know or be aware when it is going to receive a paging message and automatically causes the device 20 to wake itself up in sufficient time to receive the message. For example, the network may inform the device 20 when a paging message will be transmitted. The device 20 may demodulate the symbols of only a portion of a just received paging message such as the symbols in the first time slot or a portion of the first time slot. The symbols may then be processed by the control circuitry 44 (executing the power save instructions as depicted by ref. 46) including determining log likelihood ratios (LLRs) for each received data bit included in the portion of the message being processed. The control circuitry 44 may then compare the determined LLRs of the portion of the just received paging message to the bits of a portion or portions of a previously received message or messages saved and stored in the database 34 that the control circuitry 44 has previously determined is not directed to the device 20.

If the control circuitry 44 determines that the just determined LLRs substantially match the bits of the portion or portions of the previously received message or messages, then the control circuitry 44 will determine that that the just received message is a repeated message and is not meant for the device 20 and may cause the device 20 to revert back into the idle mode causing the device 20 to shut down all or most of its components without having to process the rest of the just received message. These and other aspects of various embodiments will be described in greater detail herein.

Figure 3:
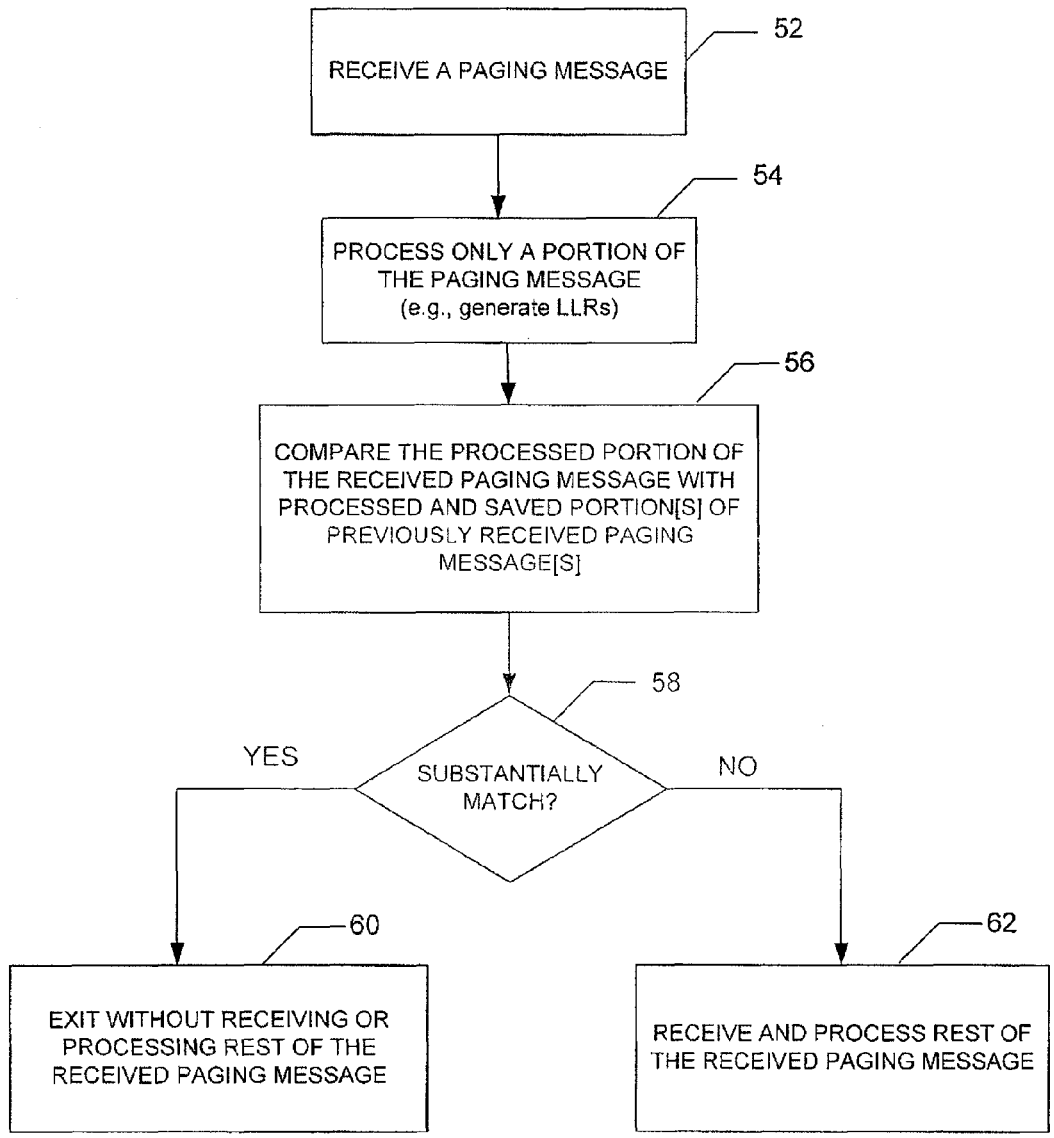
FIG. 3 illustrates a process in accordance with various embodiments of the present invention.

FIG. 3 illustrates a process for a wireless device to analyze an interleaved paging message by processing and analyzing only a portion of the message and without having to process the entire message in accordance with various embodiments of the present invention. Although the process 50 is described as a process for analyzing an interleaved paging message, in alternative embodiments, the process 50 may be employed in order to analyze a paging message that is only partially interleaved or a paging message that is not interleaved at all. The process 50 may be implemented by a mobile wireless device, such as device 20 of FIG. 2, and may begin when an interleaved paging message (or simply "paging message") is received by the device 20 via the antenna 24 at 52. In some alternative embodiments, the device 20 may initially determine whether the SINR of the communication channel is equal to or greater than, for example, 10 dB, or some other predetermined value. If not, then the device 20 may employ other techniques to analyze paging messages, as previously described. Otherwise, the device 20 may continue with the process 50.

In some embodiments, the received paging message (herein "just received paging message") may comprise four bursts, each burst corresponding to four time slots, a first, a second, a third, and a fourth time slot. Each of the bursts may comprise 116 bits of data (i.e., "received data bits") or some other number of bits. A portion of the just received paging message may then be processed at 54. In various embodiments, the portion of the just received paging message to be processed may be fully interleaved, partially interleaved, or not interleaved at all depending upon, for example, whether the paging message was a fully interleaved message, a partially interleaved message, or a noninterleaved message.

The processing of the portion of the just received interleaved message, which may be facilitated, at least in part, by the control circuitry 44, may include, for example, demodulation and generation of LLRs. For each of the received data bits included in the portion being processed, a corresponding LLR may be generated. In some embodiments, the LLRs to be generated may each be defined by four bits (3 bits for a numeric value and 1 bit for plus or minus sign). For these embodiments, an LLR may have a value ranging from +7 (which indicates strongly that the corresponding received data bit is a logic 1) to −7 (which indicates strongly that the corresponding received data bit is a logic 0). If an LLR has a value of 0, then the corresponding received data bit is judged to have an equal chance of being a logic 1 or logic 0. As will be described in greater detail herein, only those generated LLRs having absolute values that are greater than or equal to a threshold value will be considered "good" and will be used in subsequent operations to be described herein. In some embodiments, the threshold value may be 6. Thus, for these embodiments, only LLRs with values of −6, −7, +6, and +7 may be considered.

In some embodiments, the portion of the just received paging message to be processed and analyzed may include an entire burst corresponding to the first time slot (herein "first burst"), or alternatively, may only include a portion of the first burst. Further, in some instances, and as will be described in greater detail herein, if that processed portion (i.e., signals or LLRs) of the first burst is determined to be not acceptable or not good, then the second, the third, or the fourth bursts corresponding to the second, third, and fourth time slots, or portions thereof, may be processed to determine whether to go into idle mode or remain in wake mode.

In any event, after the control circuitry 44 generates sufficient number of good LLRs (e.g., those LLRs have absolute values of 6 or greater), the control circuitry 44 may then compare the processed portion (e.g., good LLRs) of the just received paging message to the processed portion or portions (e.g., bits) of one or more previously received paging messages at 56. That is, in some embodiments, the LLRs of the processed portion of the just received paging message may be compared to the bits of a processed portion of a previously received paging message. In some alternative embodiments, however, the LLRs of the processed portion of the just received paging message, rather than being compared to bits of only one previously received paging message, may be compared to the bits of the processed portions of two or more previously received paging messages that may be stored in the database 34.

These previously received paging messages (or at least the processed portions of these received messages) may be stored in the database 34. Note that since it takes more power and time to compare the processed portion of the just received paging message to a greater number of processed portions of previously received paging messages, it may be advantageous to limit the number of comparisons made. That is, in some embodiments, the control circuitry 44 may compare the LLRs of the processed portion of the just received paging message to the bits associated with only one or two previously received paging messages. Alternatively, the control circuitry 44 may compare the LLRs of the processed portion of the just received paging message to the bits associated with three or more previously received paging messages in some alternative embodiments. Many approaches may be employed in order to select which of the previously received messages will be stored in the database 34 for comparison purposes. For example, in one embodiment, the previously received paging messages that have been determined to have been most frequently transmitted may be stored in the database 34.

Returning to FIG. 3, a determination may then be made at 58 by the control circuitry 44, as to whether there is a "substantial match," between the processed portion (e.g., good LLRs) of the just received paging message, and the processed portion or portions (e.g., bits) of previously received paging message or messages (that are saved into database 34) that have been determined to be not directed to the device 20. In the case where the portion of the just received paging message includes an entire burst (e.g., 116 bits) corresponding to the first time slot, a substantial match may occur when four or fewer of the received data bits (i.e., four or fewer LLRs) are determined not to match with corresponding bits of portion or portions of previously received paging message or messages. If so, a substantial match may be declared, and the just received paging message is determined to be a repeat message, in which case, the control circuitry 44 may cause the device 20 to exit from the wake mode and may or may not go into an idle mode without processing the rest of the just received paging message at 60. That is, the device 20 may not necessary go directly into the idle mode depending upon the message content. In any event, if there is no substantial match (e.g., if more than four of the originally received data bits are determined not to match with corresponding bits of portion or portions of previously received paging message or messages), then the control circuitry 44 may cause the device 20 to remain in a wake mode to process the rest of the just received paging message at 62.

Figure 4:
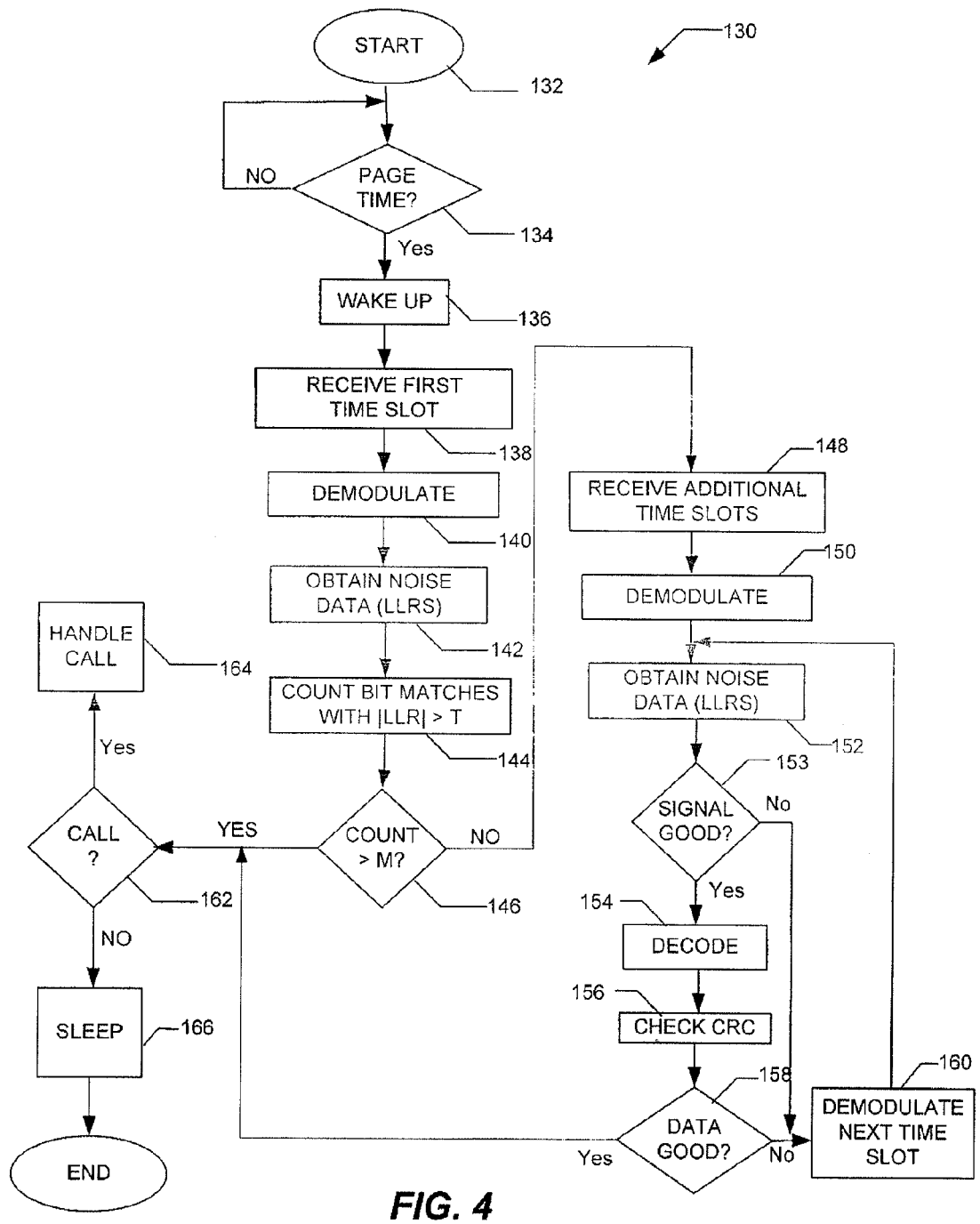
FIG. 4 illustrates another process in accordance with various embodiments of the present invention.

FIG. 4 depicts a power save process for causing a mobile device to go into an idle (i.e., sleep) mode or to go into (or remain in) a wake mode by processing a portion or portions of a paging message in accordance with various embodiments of the present invention. In some embodiments, the process 130 may be implemented by a wireless mobile device, such as the mobile device 20 of FIG. 2. In particular, the process 130 may be facilitated, at least in part, by the control circuitry 44 in accordance with instructions stored in a computer readable medium (such as power save block 46 of FIG. 2). The process 130 may allow the device 20 to initially process and analyze only a portion (e.g., the first time slot) of an interleaved message, and if that is not sufficient, to process additional portions (e.g., second, third, and/or fourth time slot) of the interleaved message.

The process 130 may start at 132 when a determination is made as to whether a paging message time has arrived at 134. If so, the device 20 may sufficiently awaken to receive a paging message at 136. In some embodiments, the paging message that is received may be an interleaved paging message, a noninterleaved paging message, or a partially interleaved paging message. The device 20 may then receive and demodulate the symbols of a portion of the paging message, which in some instances, may be the first burst of the first time slot, at 138 and 140. As previously indicated, in some alternative embodiments, however, only a portion of the first time slot may be demodulated.

Next, noise data for the demodulated portion of the paging message may be obtained including carrier to interference ratio (CIR) data and LLRs for each received data bit (i.e., symbol) included in the demodulated portion (e.g., first time slot or a portion thereof) of the paging message at 142. A count may then be made at 144 to make sure that the there are a sufficient number of the generated LLRs that equals or exceeds a minimum acceptable confidence level (T) in order to provide reliable results. For example, in an earlier example where each LLR can be defined by four bits, an LLR can have value in the range from −7 (high confidence that the corresponding received data bit or symbol is supposed to be logic 0) to +7 (high confidence that the corresponding received data bit or symbol is supposed to be logic 1). For these embodiments, the minimum acceptable confidence level (T) may be set, for example, at 6. Note, however, that in alternative embodiments, the minimum acceptable confidence level (T) may be another value other than 6.

The number of LLRs that equal or exceeds this minimum confidence level may then be counted and a determination may be made as to whether the total number of LLRs that exceeds the minimum confidence level exceeds the minimum number (M) of "good" LLRs that are required in order to perform a subsequent comparison analysis (i.e., comparing the current LLRs with the LLRs of previously received and stored paging messages). Once it is assured that a sufficient number of good LLRs has been generated (with relatively high confidence levels), only the generated LLRs that have relatively high confidence levels may then be compared to bits from previously received paging messages at 162. For example, if the portion of the received paging message to be modulated and analyzed includes all 116 bits of the first time slot (thus 116 LLRs are generated), then a determination may be made, in one embodiment, as to whether at least 113 good LLRs are present (in this case, M=113) that substantially matches the message templates (i.e., bits) of previously received paging messages. Of course the value for M may be set to another number other than 113 in alternative embodiments. For example, if only a portion of the first full burst is being processed (e.g., 58 bits) rather than the full burst, than M may be set at, for example, 56. In any event, if the count is less than M, then an additional portion of the paging message, such as the bursts corresponding to the second and third time slots, or portions thereof, may be received and the symbols of the additional portion may be demodulated at 148 and 150.

Noise data including CIR data and LLRs for each received data bit (i.e., symbol) included in the demodulated additional portion may be obtained at 152. A determination may then be made as to whether the received signal (i.e., the additional portion of the paging message that was demodulated) is good at 153. In other words, a check is made as to whether the signal is sufficiently low in noise, and if so, the additional portion (i.e., demodulated symbols of the additional portion) may be decoded at 154. Next, an error code may be checked as indicated at 156. If the additional received data (i.e., the additional portion of the paging message received at 148) is determined to be "good data" (e.g., computed CRC match previous known value) as determined at 158, a check at 162 determines whether there is another incoming message such as a telephone call. If so, that call may be handled as indicated by 164. The check at 162 may further include the process depicted in FIG. 3 in order to determine whether the paging message is or is not directed to the device 20. If not, the device 20 can return to the idle or sleep mode as indicated by 166 wherein most of the device components are shut down to conserve power.

If, at 153, it is determined that the signal is too noisy, the operations of 154 and 156 may be skipped and the process 130 may continue to demodulate the next time slot (or portion thereof) as indicated by 160. In such case, it has been determined that the signal is too noisy and therefore it would be a waste of power to proceed with decoding when the odds of success are so low. As a result, power consumption may be preserved by avoiding unnecessary mathematical decoding operations.

Similarly, if, as a result of the decoding, it is determined that the data from the first and second time slots is not sufficient, the flow proceeds to demodulate an ensuing time slot. In such case, the decoding of an ensuing time slot increases the power consumption, but in such case, it is necessary to proceed in this fashion.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
receiving, by a mobile device of a wireless network, a first paging message;
processing, by the mobile device, a portion of the first paging message including comparing the processed portion of the first paging message with a processed portion of a second paging message previously received by the mobile device;
determining, by the mobile device, whether to process other portions of the first paging message based at least in part on the comparison; and
causing, by the mobile device, the mobile device to go into an idle mode based at least in part on the comparing of the processed portion of the first paging message to the processed portion of the second paging message,
wherein the mobile device goes into an idle mode when the processed portion of the first paging message substantially matches the processed portion of the second paging message, and
wherein each of the processed portions of the first and second paging messages includes a plurality of bits, and the processed portion of the first paging message substantially matches the processed portion of the second paging message if four or fewer bits of the processed portion of the first paging message do not match corresponding bits of the processed portion of the second paging message.

2. The method of claim 1, wherein:
said receiving comprises receiving a first paging message including four bursts, the four bursts corresponding to four sequential time slots including a first time slot, a second time slot, a third time slot, and a fourth time slot;
the portion of the first paging message includes at least a portion of a burst corresponding to the first time slot; and
the other portions of the first paging message include at least bursts corresponding to the second time slot, the third time slot, and the fourth time slot.

3. The method of claim 2, wherein said at least a portion of the burst corresponding to the first time slot includes an entire burst corresponding to the first time slot.

4. The method of claim 1, wherein:
said processing comprises comparing the processed portion of the first paging message with a processed portion of a third paging message previously received by the mobile device; and
the method further comprises the mobile device determining whether to process other portions of the first paging message based at least in part on the comparison of the processed portion of the first paging message with the processed portion of the third paging message.

5. The method of claim 4, further comprising determining, by the mobile device, not to process the other portions of the first paging message if the processed portion of the first paging message substantially matches (i) the processed portion of the second paging message or (ii) the processed portion of the third paging message.

6. The method of claim 4, further comprising, prior to receiving the first paging message, storing the processed portions of the second and third paging messages.

7. The method of claim 1, wherein:
said processing comprises determining log likelihood ratios (LLRs) of the bits of the processed portion of the first paging message; and
said comparing comprises comparing the LLRs of the first paging message with bits of the processed portion of the second paging message.

8. The method of claim 7, wherein the second paging message is directed to another mobile device, or is an empty message, and said comparing comprises determining whether the LLRs of the bits of the portion of the first paging message substantially matches the bits of the portion of the second paging message, and if the LLRs of the bits of the processed portion of the first paging message substantially matches the bits of the processed portion of the second paging message, the mobile device causing the mobile device to go into an idle mode to not process the other portions of the first paging message.

9. The method of claim 1, wherein:
the second paging message is directed to another mobile device, or is an empty message; and
the method further comprises the mobile device going into an idle mode to not process the other portions of the first paging message if the processed portion of the first paging message substantially matches the processed portion of the second paging message.

10. The method of claim 1, wherein said receiving comprises receiving by the mobile device a portion of a first paging message from a base station of a wireless network, the first paging message being an interleaved paging message.

11. The method of claim 10, further comprising determining by the mobile device whether a communication channel between the base station and the mobile device has a signal to interference plus noise ratio (SINR) of equal to or greater than 10 dB prior to said comparing and said determining, to determine whether to proceed with said comparing and determining.

12. An apparatus, comprising:
a receiver to receive paging messages;
a database to store at least processed portion or portions of one or more paging messages; and
control circuitry configured to (i) process a portion of a first paging message received by the apparatus from a wireless network including comparing the processed portion of the first paging message with a processed portion of a second paging message previously received by the apparatus and stored in the database, (ii) determine whether to process other portions of the first paging message based at least in part on the comparison, and (iii) cause the apparatus to go into an idle mode based at least in part on the comparing of the processed portion of the first paging message to the processed portion of the second paging message,
wherein the control circuitry is configured to cause the apparatus to go into an idle mode when the control circuitry determines that the processed portion of the first paging message substantially matches the processed portion of the second paging message, and
wherein each of the processed portions of the first and second paging messages includes a plurality of bits, and the control circuitry is configured to determine that the processed portion of the first paging message substantially matches the processed portion of the second paging message if four or fewer bits of the processed portion of the first paging message do not match corresponding bits of the processed portion of the second paging message.

13. The apparatus of claim 12, wherein:
the apparatus is configured to receive a first paging message including four bursts, the four bursts corresponding to four sequential time slots including a first time slot, a second time slot, a third time slot, and a fourth time slot;
the portion of the first paging message includes at least a portion of a burst corresponding to the first time slot; and
the other portions of the first paging message include at least bursts corresponding to the second time slot, the third time slot, and the fourth time slot.

14. The apparatus of claim 13, wherein said control circuitry is configured to process at least a portion of the burst corresponding to the first time slot including an entire burst corresponding to the first time slot.

15. The apparatus of claim 12, wherein the control circuitry is configured to (i) compare the processed portion of the first paging message with a processed portion of a third paging message previously received by the apparatus, and (ii) determine whether to process other portions of the first paging message based at least in part on the comparison of the processed portion of the first paging message with the processed portion of the third paging message.

16. The apparatus of claim 15, wherein the control circuitry is further configured to cause the apparatus to not process the other portions of the first paging message if the control circuitry determines that the processed portion of the first paging message substantially matches (i) the processed portion of the second paging message or (ii) the processed portion of the third paging message.

17. The apparatus of claim 15, wherein the apparatus is configured to store the processed portions of the second paging message and the third paging message into the database prior to receiving the first paging message.

18. The apparatus of claim 12, wherein the the control circuitry is configured to (i) determine log likelihood ratios (LLRs) of the bits of the processed portion of the first paging message, and to compare the LLRs of the first paging message with bits of the processed portion of the second paging message.

19. The apparatus of claim 18, wherein:
the second paging message is (i) directed to another apparatus of the wireless network, or (ii) is an empty message; and
the control circuitry is configured to (i) determine whether the bits of the processed portion of the first paging message substantially matches the bits of the processed portion of the second paging message, and (ii) if the LLRs of the bits of the processed portion of the first paging message substantially matches the bits of the processed portion of the second paging message, cause the apparatus to go into an idle mode to not process the other portions of the first paging message.

* * * * *